June 27, 1939. G. B. WATKINS ET AL 2,163,648
MANUFACTURE OF LAMINATED SAFETY GLASS
Filed May 9, 1936 2 Sheets-Sheet 1
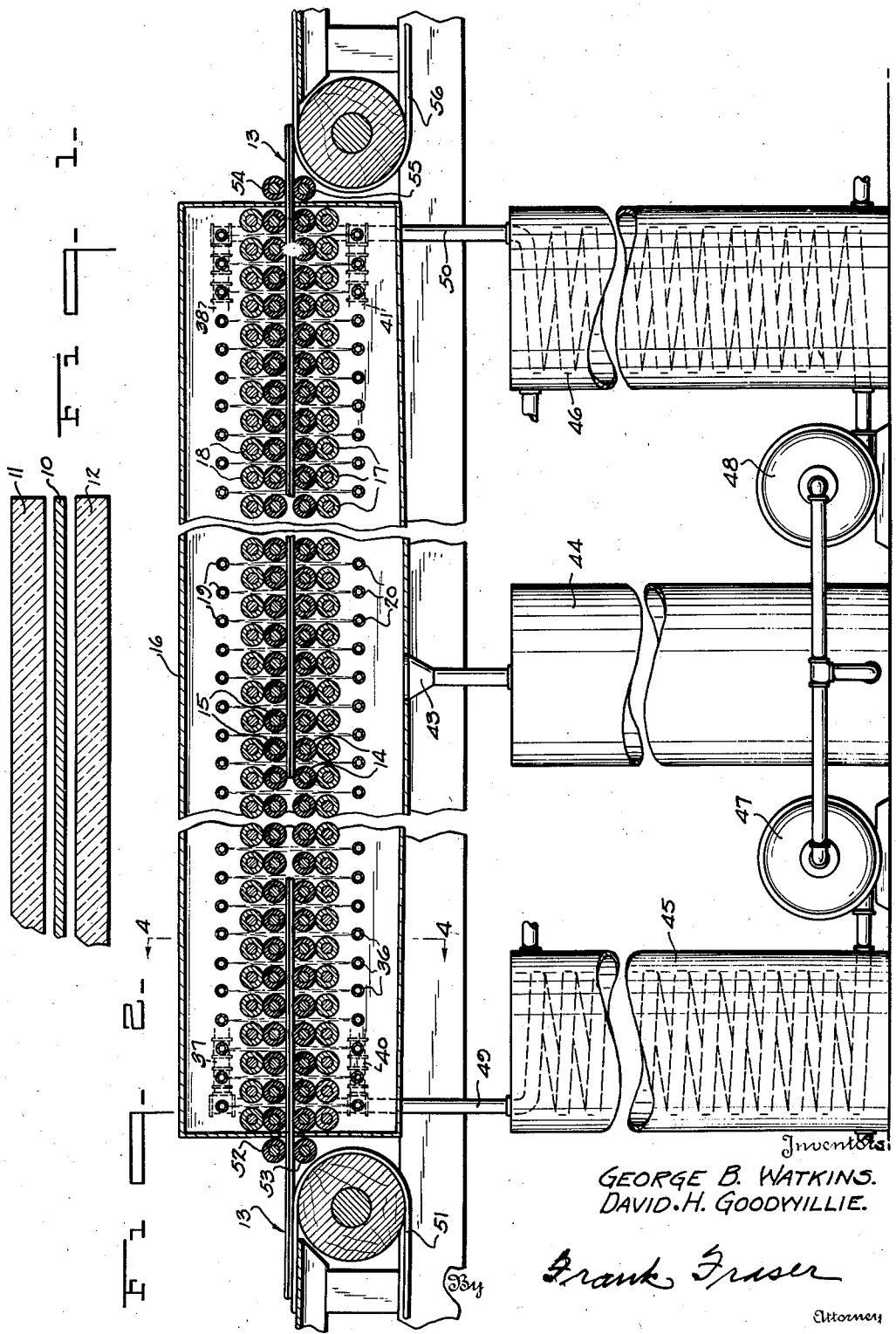
Inventors
GEORGE B. WATKINS.
DAVID. H. GOODWILLIE.
By Frank Fraser
Attorney June 27, 1939.   G. B. WATKINS ET AL   2,163,648
MANUFACTURE OF LAMINATED SAFETY GLASS
Filed May 9, 1936   2 Sheets-Sheet 2
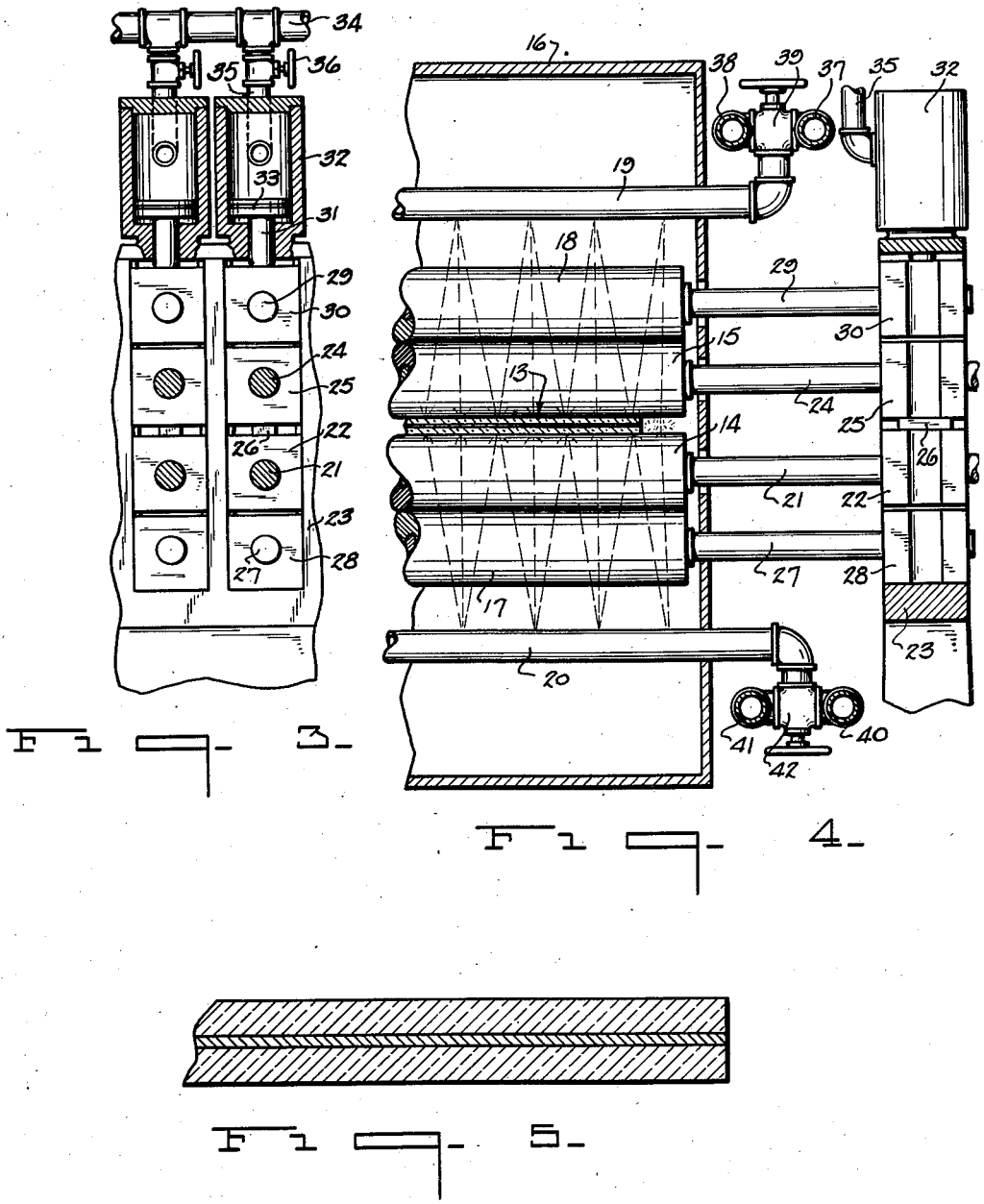
Inventors
GEORGE B. WATKINS.
DAVID H. GOODWILLIE.
By Frank Fraser
Attorney Patented June 27, 1939

2,163,648

UNITED STATES PATENT OFFICE 2,163,648

MANUFACTURE OF LAMINATED SAFETY GLASS

George B. Watkins and David H. Goodwillie, Toledo, Ohio, assignors to Libbey-Owens-Ford Glass Company, Toledo, Ohio, a corporation of Ohio Application May 9, 1936, Serial No. 78,740

7 Claims. (Cl. 49—81)

This invention relates to the manufacture of laminated safety glass.

In carrying out the invention, a sheet of synthetic resin plastic is interposed between two sheets of glass to form a "sandwich" which is then subjected to a pressing operation at suitable temperatures to effect the bonding of the laminations to form a composite structure. The resin plastic used may consist of properly plasticized Butylvar, Formvar, Alvar, the acrylic acid ester type of resin, vinyl acetate, etc. It has been found that a resin plastic, when bonded between glass sheets, will offer greater resistance to impact at high, medium, and low temperatures normally encountered in actual use than will similar laminated glass having a cellulosic derivative plastic bonded between the glass sheets. It is characteristic of the cellulosic derivative plastics to become relatively more brittle at the lower temperatures and it has been an aim in the art for some time to avoid this tendency toward brittleness.

The object of the present invention is the provision of an improved apparatus for effecting the bonding together of the laminations in a rapid, efficient, and economical manner. More particularly, the invention comprehends the bonding together of the laminations in a continuous manner by means of a roll type of press including a plurality of pairs of pressing rolls between which the assembled laminations are passed, the said rolls being of such a size and so spaced that they prevent any substantial flexing or bending of the glass sheets during the pressing operation.

The amount of pressure applied to the laminations as well as the temperature thereof is varied during pressing in such a manner as to first exclude air and non-condensable gases from between the laminations, after which permanent adhesion is obtained.

In the drawings wherein like numerals are employed to designate like parts throughout the same:

Fig. 1 is a diagrammatic sectional view showing two sheets of glass and a layer of plastic in proper superimposed relationship;

Fig. 2 is a longitudinal vertical sectional view of the apparatus employed for bonding the assembled laminations;

Fig. 3 is a side elevation of a portion of the apparatus, partially in section, showing the means for controlling the pressure of the rolls;

Fig. 4 is a vertical sectional view taken substantially on line 4—4 of Fig. 2; and Fig. 5 is a sectional view of the finished laminated sheet.

Referring first to Fig. 1, there is illustrated a sheet 10 of a suitable synthetic resin plastic such as, for example, Alvar, Formyar, or Butylvar type of resin disposed between the two sheets of glass 11 and 12. The sheet 10 is a preformed layer of plastic including any preferred and selected amount of plasticizer, and it will be understood that adhesives or other bond inducing mediums can be employed to promote the requisite bond between the laminations or not, as desired.

After the laminations have been arranged in properly assembled relationship, to form a sandwich, the said sandwich is subjected to the desired temperatures and pressures to unite the laminations and thus form a unitary structure. The pressing of the sandwiches is adapted to be accomplished in a continuous manner and by means of a roll type of press, such as shown in Fig. 2, wherein the sandwiches 13 are passed horizontally between a series of pairs of horizontally aligned rolls 14 and 15 preferably of rubber or rubber composition and enclosed in a housing 16.

One of the difficulties experienced in bonding laminated glass in a continuous manner using roll pressure has been the slight flexing action of the glass, because of the unequal distribution of pressure on the laminations as they pass between the rolls. When using the softer plastics, particularly plastics made from the vinyl type of resin, such as Formvar, Alvar, and Butylvar, there is even a greater tendency toward flexing of the glass-plastic sandwich due to the greater plasticity or lack of rigidity of the resin type of plastics. Obviously, the flexing action is increased with increased plasticity of the plastic, with increasing pressure on the rolls, increasing distances between roll centers applying the pressure, and with decreasing glass thickness used in preparing the glass-plastic sandwich.

We have found that it is possible to prevent any flexing or bending of the glass sheets by materially reducing the diameter of the rolls and in positioning them sufficiently close together so that they will act upon the laminations in a manner similar to a rigid platen press. For instance, our work along this line indicates that rolls approximately one inch in diameter and spaced one-quarter inch apart will be satisfactory for continuously pressing resin plastic laminations using one-eighth inch plate glass. The softer characteristics of the resin plastics permits the molding and satisfactory bonding of the plastic-glass laminations with a pressure sufficiently low so as not to produce undue bending or flexing of the glass plates as they pass continuously between the small rolls.

One of the disadvantages in using the small pressing rolls, however, in a press of this kind is the actual bending of the rolls themselves, particularly in a pressing machine of substantial width such as a machine sufficiently wide to accommodate a forty-eight inch width light of glass. This bending of the rolls obviously creates unequal pressure with respect to the glass sheets being pressed. To overcome this difficulty, we propose the backing-up of the small pressing rolls 14 and 15 with the rolls 17 and 18, the said rolls 17 and 18 contacting with rolls 14 and 15 respectively and furnishing sufficient reinforcement to prevent the bending or distortion of the small rolls contacting the glass.

As the glass-plastic sandwich progresses between the pairs of pressing rolls 14 and 15, the pressure of the said rolls thereon is gradually reduced while the temperature thereof is simultaneously increased. The gradual lessening of the roll pressure can be accomplished by proper regulation of the rolls while the gradual increase in temperature may be effected by spraying jets of heated liquid upon opposite surfaces of the sandwich from perforated pipes 19 and 20 extending transversely within the housing 16 above and beneath the rolls or in any other desired manner. The rolls 14 and 15 at the forward end of the housing are adapted to exert the desired maximum pressure upon the sandwich and this pressure is gradually decreased toward the exit end thereof where the desired minimum pressure is employed. The exact pressure upon the sandwich and likewise the temperature thereof would depend upon the type of plastic being bonded and would be such as to effect satisfactory bonding for safety glass purposes.

The mounting of the pressing and backing-up rolls is shown in Figs. 3 and 4, and it will be seen that the lower pressing roll 14 of each pair is carried upon a shaft 21 projecting at its opposite ends through the side walls of the housing 16 and journaled at each end in a bearing block 22 mounted in a vertical standard 23, while the corresponding upper roll 15 is carried upon a shaft 24 also projecting at opposite ends beyond the housing and journaled at each end in a bearing block 25 slidably mounted in the standard 23 above bearing block 22. Arranged between the bearing blocks 22 and 25 is a wedge 26 which limits the movement of the said blocks and consequently the pressing rolls 14 and 15 toward one another.

The backing-up roll 17 for each pressing roll 14 is carried by a shaft 27 journaled in bearing blocks 28 positioned beneath bearing blocks 22, while the backing-up roll 18 for the pressing roll 15 is carried by a shaft 29 journaled in bearing blocks 30 located above bearing blocks 25.

The upper bearing blocks 30 are each provided with a vertical rod 31 which projects upwardly through the bottom of a cylinder 32 supported upon the top of the respective standard 23 and fixed to the rod 31 within the cylinder is a piston 33. Extending longitudinally at each side of the housing 16 is a supply pipe 34 containing either liquid or air under pressure and which is in communication with each of the cylinders 32 at the corresponding side of the housing by means of a pipe 35 within which is disposed a valve 36 provided to control the amount of compressed air or liquid supplied to the cylinder. With this arrangement, the pressure exerted by the individual pairs of pressing rolls 14 and 15 upon the laminations can be independently controlled.

Extending longitudinally at one side of the housing 16, adjacent the top thereof, is a pair of spaced parallel supply pipes 37 and 38 with which each perforated transverse pipe 19 communicates through a mixing valve 39. Also extending longitudinally of the housing, adjacent the bottom thereof, is a pair of similar supply pipes 40 and 41 with which the perforated transverse pipes 20 communicate through mixing valves 42. The pipes 37 and 40 are adapted to be supplied with a suitable heated liquid such as water while pipes 38 and 41 are adapted to receive a suitable cooling liquid, and by proper adjustment of the mixing valves 39 and 42, liquid of the desired temperature can be fed to the transverse pipes 19 and 20 from which it is sprayed upon opposite surfaces of the sandwiches 13 as they pass between the rolls. The pipes 19 and 20 are so positioned that the liquid sprays therefrom pass between the adjacent pressing and backing-up rolls as clearly shown in Fig. 2.

The bottom of the housing 16 is inclined downwardly from both ends to the central outlet 43 connected to a reservoir 44. Positioned at opposite sides of the reservoir are the two heat exchangers 45 and 46 and the liquid is adapted to be pumped from the reservoir through the said heat exchangers by the motors 47 and 48 respectively. The liquid, in passing through the heat exchanger 45, is adapted to be heated and passes therefrom through a pipe 49 which communicates with both of the supply pipes 37 and 40 while the liquid passing through the heat exchanger 46 is adapted to be cooled and passes therefrom through a pipe 50 which communicates with both of the supply pipes 38 and 41. Thus, it will be seen that heated liquid is being continuously passed through pipes 37 and 40 and cooling liquid through pipes 38 and 41 so that by proper control of the mixing valves 39 and 42, liquid of the desired temperature can be supplied to the transverse perforated pipes 19 and 20.

To press the sandwiches 13, they are first placed upon a conveyor 51 from which they are passed between a pair of nipping rolls 52 and 53 and thence into the housing 16 and between the pressure rolls 14 and 15 which are positively driven in any suitable manner to advance the sandwiches through the said housing. In view of the fact that the resin plastics above set forth might be tacky at normal temperatures, the first pair of rolls or group of rolls are adjusted to exert the desired maximum pressure upon the sandwiches and during this pressing treatment the sandwiches are either at normal room temperature or a lower temperature, with the result that air and non-condensable gases will be swept from between the glass-plastic laminations. Then, as the sandwiches progress between the rolls, the temperature thereof is gradually raised to the point necessary for bonding the laminations. As the temperature of the resin plastics is raised, their softness or flowability increases, and it is therefore desirable to decrease the pressure with increase in temperature to prevent flowing or extruding of the plastic and therefore pinching of the laminations around the edges thereof. As the sandwiches issue from the housing, they pass between a pair of rolls 54 and 55 onto the receiving conveyor 56.

Due to the nature of the synthetic resin plastics above set forth, it is not necessary to undercut and seal the marginal portions of the composited glass, which is shown in Fig. 5, because it has been found that weathering does not adversely affect either the plastic or the bond between the plastic and glass.

We claim:

1. Apparatus for use in the manufacture of laminated safety glass including a plurality of pairs of pressing rolls between which the assembled laminations to be bonded are adapted to be passed, a backing-up roll engaging each pressure roll to prevent bending thereof, and means for heating the laminations as they pass between the rolls.

2. Apparatus for use in the manufacture of laminated safety glass including a plurality of pairs of pressing rolls between which the assembled laminations to be bonded are adapted to be passed, a backing-up roll engaging each pressure roll to prevent bending thereof, means for independently controlling the pressure exerted by each pair of pressing rolls upon the laminations, and means for heating the laminations as they pass between the rolls.

3. Apparatus for use in the manufacture of laminated safety glass including a plurality of pairs of pressing rolls between which the assembled laminations to be bonded are adapted to be passed, a backing-up roll engaging each pressure roll to prevent bending thereof, means for cooling the laminations at the beginning of the pressing operation, and means for subsequently heating the laminations as the pressing operation continues.

4. Apparatus for use in the manufacture of laminated safety glass including a plurality of pairs of pressing rolls between which the assembled laminations to be bonded are adapted to be passed, a backing-up roll engaging each pressure roll to prevent bending thereof, means for independently controlling the pressure exerted by each pair of pressing rolls upon the laminations, means for cooling the laminations at the beginning of the pressing operation, and means for subsequently heating the laminations as the pressing operation continues.

5. Apparatus for use in the manufacture of laminated safety glass including a plurality of pairs of pressing rolls between which the assembled laminations to be bonded are adapted to be passed, a backing-up roll engaging each pressure roll to prevent bending thereof, a housing enclosing said rolls, means arranged in the forward end of the housing for cooling the laminations, and means arranged in the opposite end of said housing for heating the said laminations.

6. Apparatus for use in the manufacture of laminated safety glass including a plurality of pairs of pressing rolls between which the assembled laminations to be bonded are adapted to be passed, a backing-up roll engaging each pressure roll to prevent bending thereof, means for independently controlling the pressure exerted by each pair of pressing rolls upon the laminations, a housing enclosing said rolls, means arranged in the forward end of the housing for cooling the laminations, and means arranged in the opposite end of said housing for heating the said laminations.

7. Apparatus for use in the manufacture of laminated safety glass including a plurality of pairs of pressing rolls between which the assembled laminations to be bonded are adapted to be passed, a backing-up roll engaging each pressure roll to prevent bending thereof, means for independently controlling the pressure exerted by each pair of pressing rolls upon the laminations, a housing enclosing said rolls, means arranged in the forward end of the housing for cooling the laminations, and means arranged in the opposite end of said housing for heating the said laminations, said cooling means having a gradually reducing cooling effect upon the laminations and the heating means having a gradually increasing heating effect thereon as the said laminations pass through the said housing.

GEORGE B. WATKINS.
DAVID H. GOODWILLIE.